June 12, 1962   K. G. E. CARLSON ETAL   3,038,832
METHOD AND APPARATUS FOR THE PRODUCTION OF
FIBER REINFORCED RESIN TUBES
Filed Nov. 3, 1959
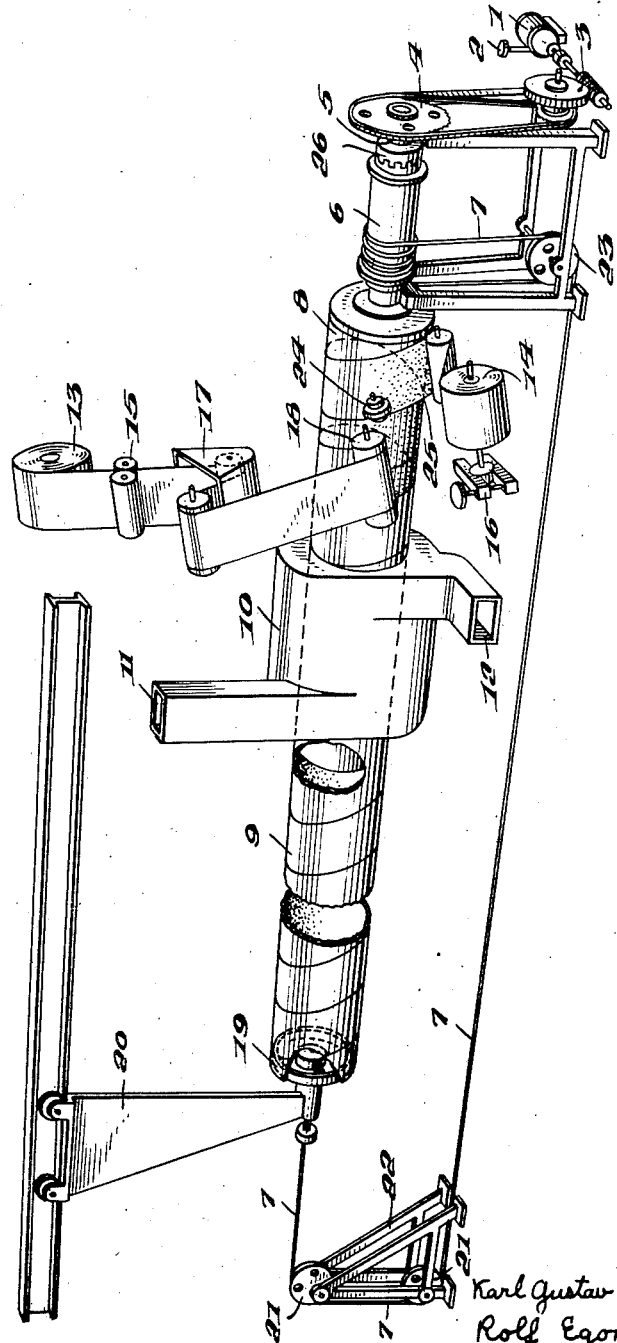
INVENTORS
Karl Gustav-Einar Carlson
Rolf Egon Rydell
BY Pierce, Scheffler + Parker
ATTORNEYS

United States Patent Office 3,038,832
Patented June 12, 1962

3,038,832
METHOD AND APPARATUS FOR THE PRODUCTION OF FIBER REINFORCED RESIN TUBES
Karl Gustav Einar Carlson and Rolf Egon Rydell, Lomma, Sweden, assignors to Aktiebolaget Hoganas Plastprodukter, Lomma, Sweden, a company of Sweden
Filed Nov. 3, 1959, Ser. No. 850,645
Claims priority, application Sweden Nov. 3, 1958
4 Claims. (Cl. 156—190)

This invention relates to a method and a machine for continuous production of tubes of fiber-reinforced synthetic resin.

Stratified plastic tubes have previously been produced by winding a web of fibrous material impregnated with a plastic around a core, curing the plastic and drawing the tube thus produced off the core.

One object of the invention is, while using the winding technique, to perform the winding action by rotating the core instead of wrapping impregnated web around a stationary core by means of rotating bobbins.

Another object is to cure or set the resin of the tube in timed relation with the winding to such a hardness that a pulling means can be applied to the set end of the tube for continuously pulling the tube off the core or mandrel in timed relation to its production and setting.

A further object of the invention is to provide suitable measures for avoiding the sticking or gluing of the plastic-impregnated fibre material on to the surface of the mandrel upon which the tube is wound and to make possible the necessary axial sliding also of the unset part of the tube when drawing the set end off the mandrel.

In order to attain these purposes and other advantages which will be evident from the following description, the method according to the invention comprises wrapping a fibrous web around a rotating mandrel, impregnating this fibrous web with a suitable thermosetting resin before, during or after it has been wound on the mandrel, curing or setting the resin and continuously pulling the tube thus formed off the mandrel in timed relation with the winding.

The main characteristic feature of the method according to the invention is that a thin foil is wound around the mandrel before the fibrous web is wound thereon, said foil consisting of a plastic material which does not stick to the surface of the mandrel and is not dissolved or penetrated by the plastic material used for the impregnation of the web. For security's sake and also for facilitating the drawing off of the tube from the mandrel the foil serving as a protecting skin between the tube and the mandrel should consist of a heat sealable material and should be wound with overlapping edges which are then sealed together in such a way that the foil forms a unitary continuous inside protective layer in the tube. Of course it is also possible to seal the overlapping edges of the foil to each other in other ways but heatsealing is the simplest method.

The invention also involves a machine for carrying out the method. This machine consists mainly of a frame, a winding mandrel journalled in said frame and suitable driving means for the rotation of said mandrel. This mandrel or core can be of different cross-sectional shapes according to the desired profile of the tube to be produced and can thus be of circular or oval cross section or have a cross section of a regular or irregular polyhedron. Around a determined portion of the core or mandrel there is provided a setting or curing chamber for the resin, which chamber may suitably extend beyond the end of the mandrel or core. Further in the extension of the axis of the core or mandrel there is provided suitable means for pulling or drawing the wound and cured tube off the mandrel or core.

A characteristic feature of a machine according to the invention is that the pulling or drawing off means is connected to the core or mandrel in such a way as to create automatically a timed relationship between the pulling or drawing off and the winding of the tube. According to a preferred embodiment, for this purpose there is used an expander grip or a chuck suspended by a traverse or a slide mounted for rolling or sliding movement on a rail or the like. Said traverse or slide is connected to a wire or chain which via bending rolls or the like leads back to a winding up drum or the like mounted upon or geared to the axis of the mandrel or core so as, by winding up the wire or chain, to cause a pulling or drawing action on the expander grip or chuck in the axial direction of the tube formed.

Beside that end of the core or mandrel which extends in front of the curing chamber and upon which the protecting foil and the reinforcement web are wound and to which the liquid thermosetting resin or plastic is supplied there are provided bobbins and guiding rollers for said foil and said reinforcement web. The bobbins or guiding rollers are journalled at such an angle to the axis of the mandrel that the successive turns of the foil and the reinforcement web will overlap. By altering the angle between the axis of said bobbins and the axis of the mandrel the pitch angle and the amount of overlapping and thus the thickness of the reinforcement and consequently also the wall thickness of the tube may be varied. Of course it is also possible to vary the said wall thickness by using different numbers or different widths of the reinforcement webs while using one and the same pitch angle.

The bobbins are journalled in the stationary machine frame and no special means need be provided for the rotation of said bobbins. The bobbins are rotatably journalled in said frame and the foil and reinforcement web are rolled off said bobbins and upon the mandrel solely by the rotation action of said mandrel and the friction between said mandrel and the foil or web respectively. It is advisable to provide said bobbins or guiding rollers for the foil and webs with braking means in order to provide for a smooth winding of said foil or webs on the mandrel.

For the protecting foil we prefer to use a heat sealable cellulose ester or ether foil or similar well-known material.

The plastic material to be used for the impregnation of the fibrous web should be of the thermosetting synthetic resin type such as polyester resin.

In the following the invention will be described more in detail with reference to the accompanying drawing illustrating by way of example a perspective view of one embodiment of a machine according to the invention.

On the drawing reference numeral 1 designates a driving motor which is suitably provided with means 2 for variation of the speed. Said motor 1 via a gear 3 and a chain transmission 4 or the like rotates a shaft 5 carrying a winding up drum 6 for the pulling or traction wire 7 and a mandrel 8 upon which the tube 9 is wrapped or formed. Around the mandrel 8 there is provided a curing or setting chamber 10 which, in the illustrated embodiment, is designed for setting the resin by means of hot air supplied through the inlet 11 and passing out through the outlet 12. This hot air for the setting chamber can suitably be circulated through a heater exchanger (not shown) for the maintenance of the desired setting temperature. Further there is provided at least one bobbin 13 for the reinforcing fibre mat or web and one bobbin 14 for the protecting foil. Braking means 15 and 16 are provided for tensioning said foil and web in order to secure a correct and smooth wrapping thereof.

In the path of the web from the bobbin to the mandrel there is provided a trough 17 containing the thermosetting resin with which the web is to be impregnated.

Such automatic impregnation is less suitable when accelerators are used in the resin in order to shorten the necessary setting time and thereby the length of the setting or curing chamber 10. In such cases it is preferred to spread the resin on the fibre web e.g. by hand directly after it has been wound upon the mandrel. For equalizing the distribution of the resin over the fibre web there is provided a spreading roller 18.

At the free end of the tube 9 there is provided an expander grip, chuck or the like 19 suspended on a traverse 20. From the gripping device 19 the traction wire 7 extends over the guiding rollers 21 supported upon a suitably movable stand 22 and a guide roller 23 on the machine frame and leads back to the winding up drum 6. Finally there is provided a sealing roller 24 for sealing the overlapping joint of the foil 25 after it has been wound upon the mandrel. This roller 25 should suitably be heated for the sealing. Of course other means known per se can be used for sealing said overlapping joints by means of a glue or other binding agent. In such a case the roller 24 only serves for pressing together the overlapping edges.

According to the invention the mandrel 8 needs not necessarily have such a length that it extends all through the setting or curing chamber 10. It is sufficient that it extends into the said chamber to such an extent that the resin in the tube wall has sufficient time to set or harden so that the tube becomes form stable when drawn off the mandrel. The final setting then can take place after the drawing off from the mandrel.

When a tube has been produced as described to a desired length it is cut off close to the setting chamber 10, the gripping device 19 is released from the tube and together with the end of the traction wire brought back and secured to the new tube. For this purpose the winding up drum 6 must be releasable from the driving motor which is brought about by means of a simple clutch 26.

When starting the machine a previously made tube is passed through the setting chamber 10 and pushed on to the mandrel to serve as a pilot.

Mats or webs of glass or other mineral fibres as well as common textile webs or fabrics may serve as reinforcement for the tubes. When using so called rowing web of glass fibres it is expedient to wind a thin glass fibre fabric directly upon the protecting foil to provide for a smooth inner surface after the removal of the protecting foil.

What is claimed is:

1. A method of continuously forming a fiber-reinforced resin tube which comprises continuously rotating a substantially cylindrical mandrel in a fixed location, continuously forming a tube adjacent one end of said mandrel, continuously moving said tube as it is formed along said mandrel through a setting zone and continuously removing said tube from the other end of said mandrel at the same rate as it is formed, said tube being formed by continuously delivering a strip of a thin foil of a cellulose derivative to said mandrel at a fixed location adjacent said one end thereof whereby said strip is wound helically around said mandrel with the edges of successive turns thereof overlapping and forming a continuous layer of said film on said mandrel, similarly continuously delivering a strip of reinforcement fibrous web to said mandrel at a fixed location further removed from said one end of said mandrel than the fixed location at which said strip of film is delivered thereto, thereby forming a continuous layer of web over said continuous film and impregnating said layer of web with a settable resin in liquid form before said tube reaches said setting zone, said tube being removed from said mandrel while both the tube and mandrel are rotating by engaging and pulling only the free end of said tube.

2. A method as claimed in claim 1, in which said foil consists of a heat sealable material and the overlapping joint between the successive turns thereof is heat sealed to form a continuous tube of said foil upon the mandrel.

3. A machine for continuous production of reinforced synthetic resin tubes comprising in combination in a machine frame, a shaft journalled for rotation on said frame, driving means for said shaft, a replaceable mandrel mounted at one end thereof upon said shaft so as to rotate with the same, bobbins for an inner foil and for a reinforcement web, guiding rollers for said foil and said web between said bobbins and said mandrel, the axis of said guiding rollers forming acute angles to the axis of said mandrel according to the desired pitch when winding said web and foil upon said mandrel, a resin setting chamber surrounding a section of the free end of said mandrel and a traction means positioned to engage only the free end of the tube for pulling the tube off of the said mandrel.

4. A machine as claimed in claim 3, in which said traction means comprises a gripping device to be secured to the leading end of the tube formed on said mandrel, a guide for said gripping device for guiding its movement in the direction of the axis of said mandrel, a stand positioned in line with the free end of said mandrel, rollers journalled for rotation on said stand, a roller journalled on said machine frame adjacent to said shaft, a drum on said shaft, and a traction wire secured to said gripping device and passing over said rollers to said drum.

References Cited in the file of this patent

UNITED STATES PATENTS

| | | |
|---|---|---|
| 2,709,400 | Bugg | May 31, 1955 |
| 2,714,414 | Ganal et al. | Aug. 2, 1955 |
| 2,748,830 | Nash et al. | June 5, 1956 |
| 2,777,501 | Fischer | Jan. 15, 1957 |
| 2,815,043 | Kleiner et al. | Dec. 3, 1957 |